United States Patent [19]
Tanaka et al.

[11] Patent Number: 6,050,730
[45] Date of Patent: Apr. 18, 2000

[54] DRIVE UNIT CAMERA PROVIDED WITH SAME

[75] Inventors: Yoshiharu Tanaka, Kawachinagano; Yoshiyuki Inoue; Junichi Tanii, both of Izumi; Yoshito Konishi, Sakai, all of Japan

[73] Assignee: Minolta Co., Ltd., Osaka, Japan

[21] Appl. No.: 09/087,844

[22] Filed: May 29, 1998

[30] Foreign Application Priority Data

Jun. 2, 1997 [JP] Japan .................................. 9-144082

[51] Int. Cl.[7] .................................................. G03B 17/24
[52] U.S. Cl. ........................... 396/411; 396/418; 396/538
[58] Field of Search ................................... 393/411, 418, 393/387, 538

[56] References Cited

U.S. PATENT DOCUMENTS

| | | | |
|---|---|---|---|
| 5,220,370 | 6/1993 | Hawai et al. | 354/173.1 |
| 5,479,231 | 12/1995 | Tanaka | 396/411 |
| 5,515,127 | 5/1996 | Nishioka | 396/411 |
| 5,697,263 | 12/1997 | Funahashi et al. | 74/665 |

*Primary Examiner*—David M. Gray
*Attorney, Agent, or Firm*—Morrison & Foerster LLP

[57] ABSTRACT

A drive unit for transmitting a drive force of a motor using cameras to handling a film comprising a fork gear capable of engaging a cartridge spool, a transmission gear to transmitting the drive force to the fork gear at least when rewinding the film within the cartridge, and a plurality of input gears disposed at respectively different positions to transmit the drive force from the motor to the transmission gear, wherein the drive gear is arranged so as to cover at least the rotational center of the fork gear, and the fork gear, drive gear, and plurality of input gears are supported by one panel.

20 Claims, 9 Drawing Sheets

DRIVE UNIT CAMERA PROVIDED WITH SAME

This application is based on Application NO. HEI 9-144082 filed in Japan, the content of which is hereby incorporated by reference.

FIELD OF THE INVENTION

The present invention relates to a drive unit for driving a plurality of drivable components. The present invention further relates to a drive unit for feeding film in cameras of the powered type to load, feed out, and rewind in film via a motor built in the body.

DESCRIPTION OF THE RELATED ART

Most current commercial cameras load, feedout and rewind in film via the drive power of a motor built in the camera body. The IX240 cartridge film used in advanced photo systems (hereinafter referred to as "APS") in particular not only functions as a housing for unexposed film, it also functions as a housing for developed film. When this cartridge is not installed in a camera, the film is completely housed internally within the cartridge. Furthermore, a light lock door is provided at the cartridge opening for feeding the film.

When loading a film cartridge in an APS camera, the cartridge light lock door must be opened and the film pulled from the cartridge for loading. This camera also requires that when the film is fully exposed, the film must be completely rewind back into the cartridge and the light lock door closed. Therefore, in APS cameras, film loading, feeding and rewinding is accomplished automatically using an internal motor for ease of film handling.

The aforesaid cartridge is about 4 mm shorter in diameter and length compared to conventional 135 roll film (35 mm film). The photographic area of one frame of the accommodated film is reduced by about 40%. Therefore, a lighter and more compact camera body may be expected. On the other hand, the placement of the necessary motor and battery within a motor powered camera is an important factor in achieving a lighter more compact form factor. Therefore, when designing a camera, the drive transmission system mainly comprising the connecting gears linking the motor, cartridge and spool is designed after achieving optimum placement of the cartridge, film winding spool, motor, battery and the like. For example, in cameras using a single focal length lens having a small barrel, the lateral width of the camera is reduced by placing the battery below the barrel, and interposing the motor between the barrel and the cartridge. In the case of cameras using a zoom lens having a large barrel, the motor and battery are respectively placed outside the cartridge. Accordingly, there is little commonality of design and components due to the differences in the drive systems of various types of cameras. Furthermore, when compatibility of design and components of the drive system is made a priority, it is difficult to achieve a light weight, compact form factor in camera design since dead space is unavoidable depending on the camera type.

SUMMARY OF THE INVENTION

An object of the present invention is to eliminate the aforesaid disadvantages by providing a drive unit for transmitting a drive force while minimizing dead space.

These objects are attained by the drive unit of the present invention comprising a fork gear capable of engaging a cartridge spool, a transmission gear to transmit a drive force to said fork gear at least when rewinding the film within the cartridge, and a plurality of input gears disposed at respectively different positions to transmit said drive force to said transmission gear, wherein said drive gear is arranged so as to cover at least the rotational center of said fork gear, and said fork gear, drive gear, and plurality of input gears are supported by at least one panel.

According to the aforesaid construction, the drive unit can be accommodated in the top section or bottom section of the cartridge compartment, such that the drive unit is capable of at least rewinding the film because it is provided with a fork gear capable of engaging the cartridge spool. Furthermore, a drive force can be transmitted to said fork gear by connecting any input gear to a drive motor (i.e., a gear mounted on the motor drive shaft), since input gears for transmitting a drive force to a transmission gear are disposed at a plurality of mutually different positions. In addition, the input gears and motor gear may engage at optional positions so as to increase the freedom of motor arrangement. Since the transmission gear is disposed so as to cover the rotational center of the fork gear (rotational axis), the size of the drive unit is reduced in the linkage direction linking the rotational center of the transmission gear and the fork gear.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
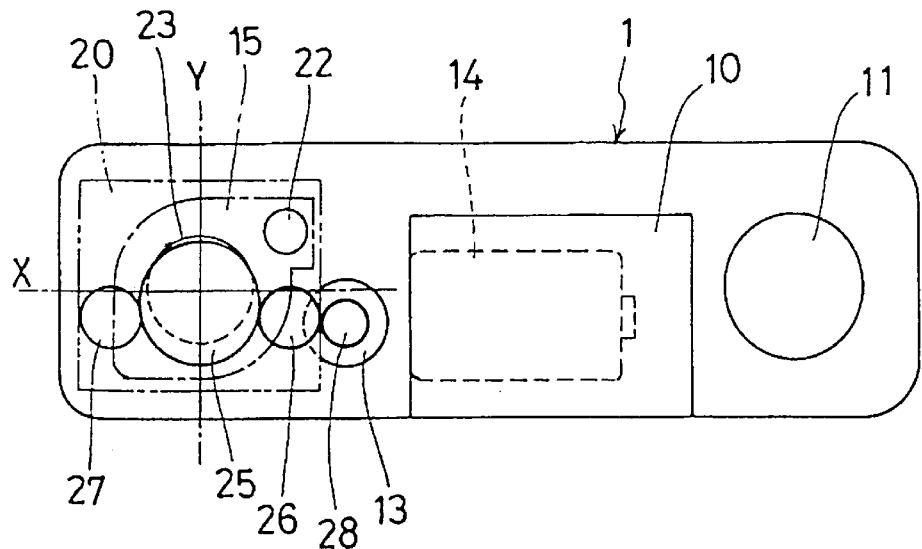
FIG. 1 is a section view of a camera having a single focal length lens and relatively small barrel using the drive unit of the present invention.
Figure 2:
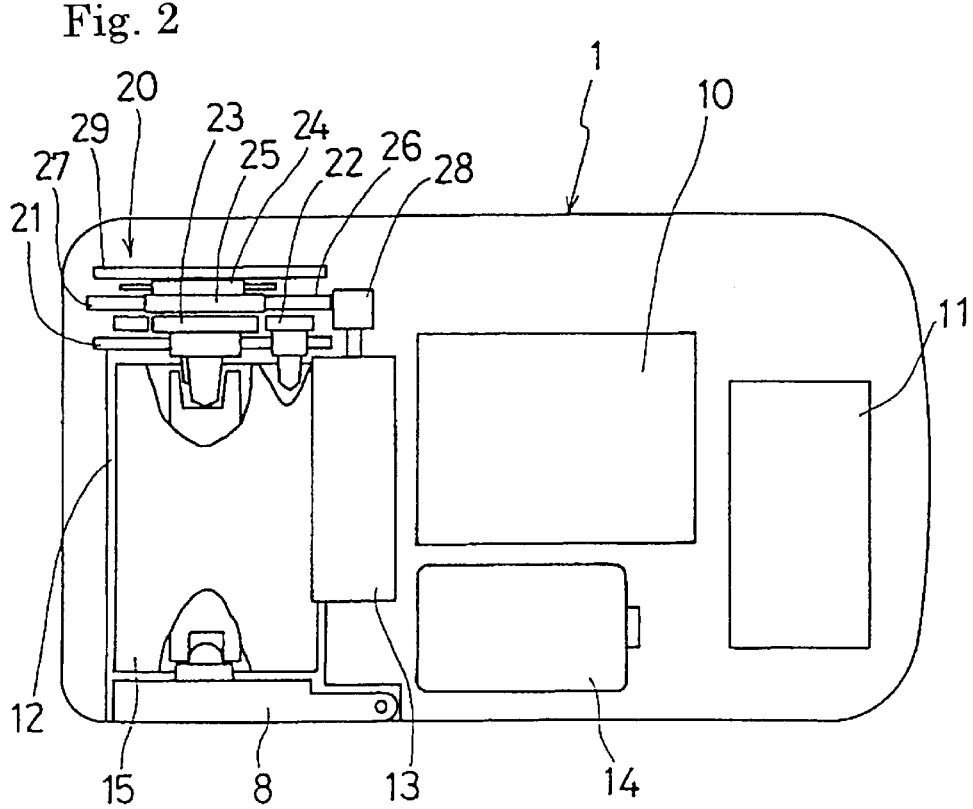
FIG. 2 is a front section view of the camera of FIG. 1.

FIG. 1 is a top plane view of a camera having a single focal length lens and relatively small barrel using the drive unit of the present invention. FIG. 2 is a front section view of the camera of FIG. 1.

In the camera shown in FIGS. 1 and 2, a cartridge compartment 12 for accommodating a cartridge 15 is provided on the left side in the drawing relative to barrel 10, and provided on the right side thereof is a spool 11 for reeling in the film fed from the cartridge 15. A drive unit 20 is provided on top of the cartridge compartment 12, and a motor 13 is interposed between barrel 10 and cartridge compartment 12. A battery 14 is provided below barrel 10. A cover 8 is provided on the bottom of cartridge compartment 12. Although not shown in the illustration, a drive gear train is provided at the top of barrel 10 to transmit a drive force from the drive unit 20 to the spool 11.

Drive unit 20 comprises a bottom baseplate 21 which also serves as a the roof of cartridge compartment 12 of camera body 1, fork gear 23 disposed so as to be freely rotatable and pass through said bottom baseplate 21, key 22 for opening and closing the light lock door of cartridge 15, transmission switching mechanism 24 for switching and transmitting the drive power of motor 13 among the fork gear 23, key 22, and the spool drive gear train, transmission gear 25 for transmitting the drive force of motor 13 to transmission/switching mechanism 24, first and second input gears 26 and 27 for transmitting the drive force of motor 13 to said transmission gear 25, and top baseplate 29 for supporting transmission gear 25, input gears 26 and 27, and transmission/switching mechanism 24. In this example, the motor gear 28 fixedly mounted to the drive shaft of motor 13 engages the first input gear 26.

The first input gear 26 and the second input gear 27 are disposed in different quadrants among four quadrants formed by a Y-axis parallel to the optical axis of the camera passing through the rotational center of the respective fork gears 23, and an X-axis perpendicular to said Y-axis. That is, the freedom of the motor disposition can be greatly expanded using a small number of input gears by dividing the plurality of input gears 26 and 27 into four quadrants using the rotational center of the fork gear 23 as a reference. At the same time, the dead space caused by unused input gears is reduced.

Cartridge 15 is provided with a box-like unit for accommodating film wound upon a spool, and a projecting part extending in a tangential direction from the box-like unit to pull the film from the cartridge. Cartridge compartment 12 has a shape similar to cartridge 15 so as to accommodate the projecting part of cartridge 15 along the X direction perpendicular to the optical axis. The first input gear 26 is disposed on the front side of the camera from the projecting part of cartridge 15 in the optical axis direction. Therefore, in a camera using a single focal length lens with a relatively small barrel, the motor can be disposed in the space between the barrel 10 and the cartridge compartment 12, as shown in FIG. 1, thereby reducing the lateral width of the camera.

Figure 3:
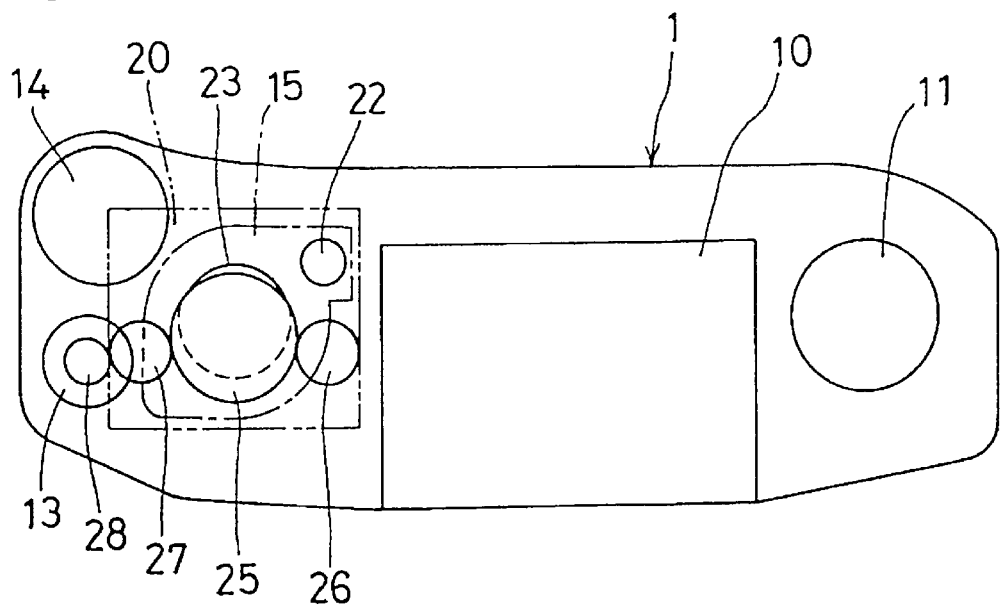
FIG. 3 is a section view of a camera having a zoom lens having a relatively large barrel using the drive unit of the present invention.
Figure 4:
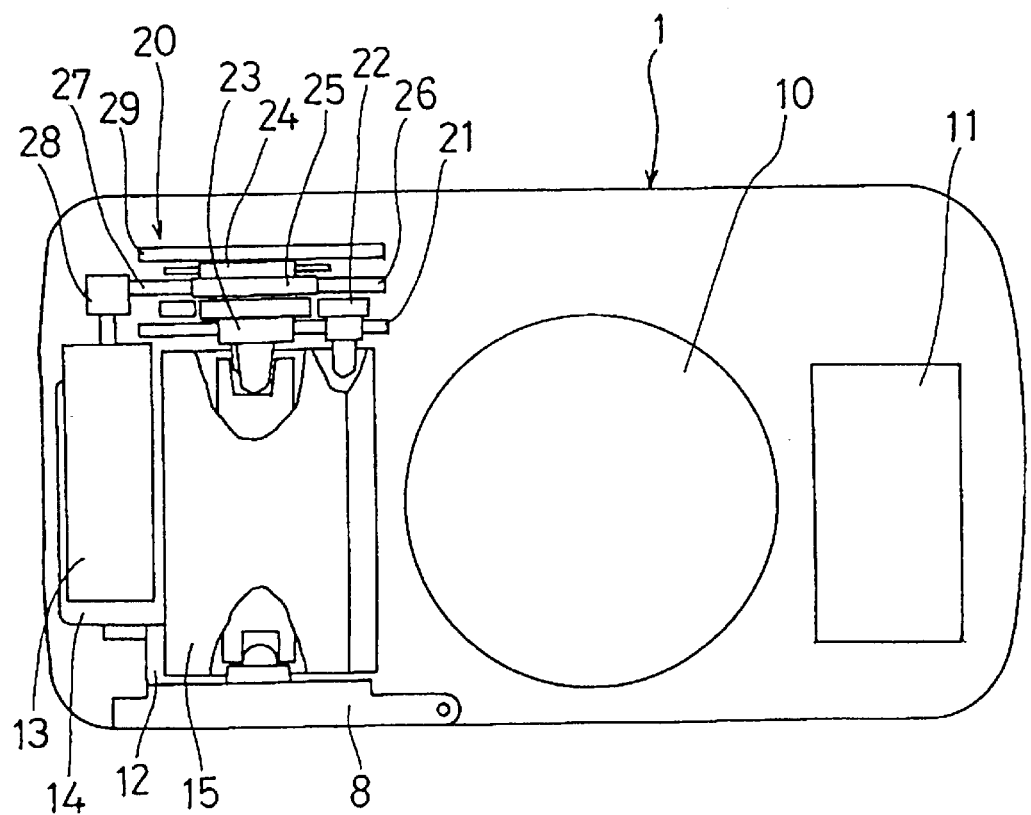
FIG. 4 is a front section view of the camera of FIG. 3.

FIG. 3 is a section view of a camera provided with a zoom lens having a relatively large barrel using the drive unit of the present invention, and FIG. 4 is a front section view of the camera of FIG. 3.

In the camera shown in FIGS. 3 and 4, cartridge compartment 12 which accommodates the cartridge 15 is situated on the left side of barrel 10 in the drawing. Drive unit 20 is disposed above cartridge compartment 12, and motor 13 is provided on the left side of cartridge compartment 12. Battery 14 is also provided on the left side of cartridge compartment 12. A cover 8 is provided on the bottom of cartridge compartment 12. Although drive unit 20 is identical to the drive unit shown in FIG. 1, in this example the motor gear 28 fixedly mounted on the drive shaft of motor 13 engages the second input gear 27.

Figure 5:
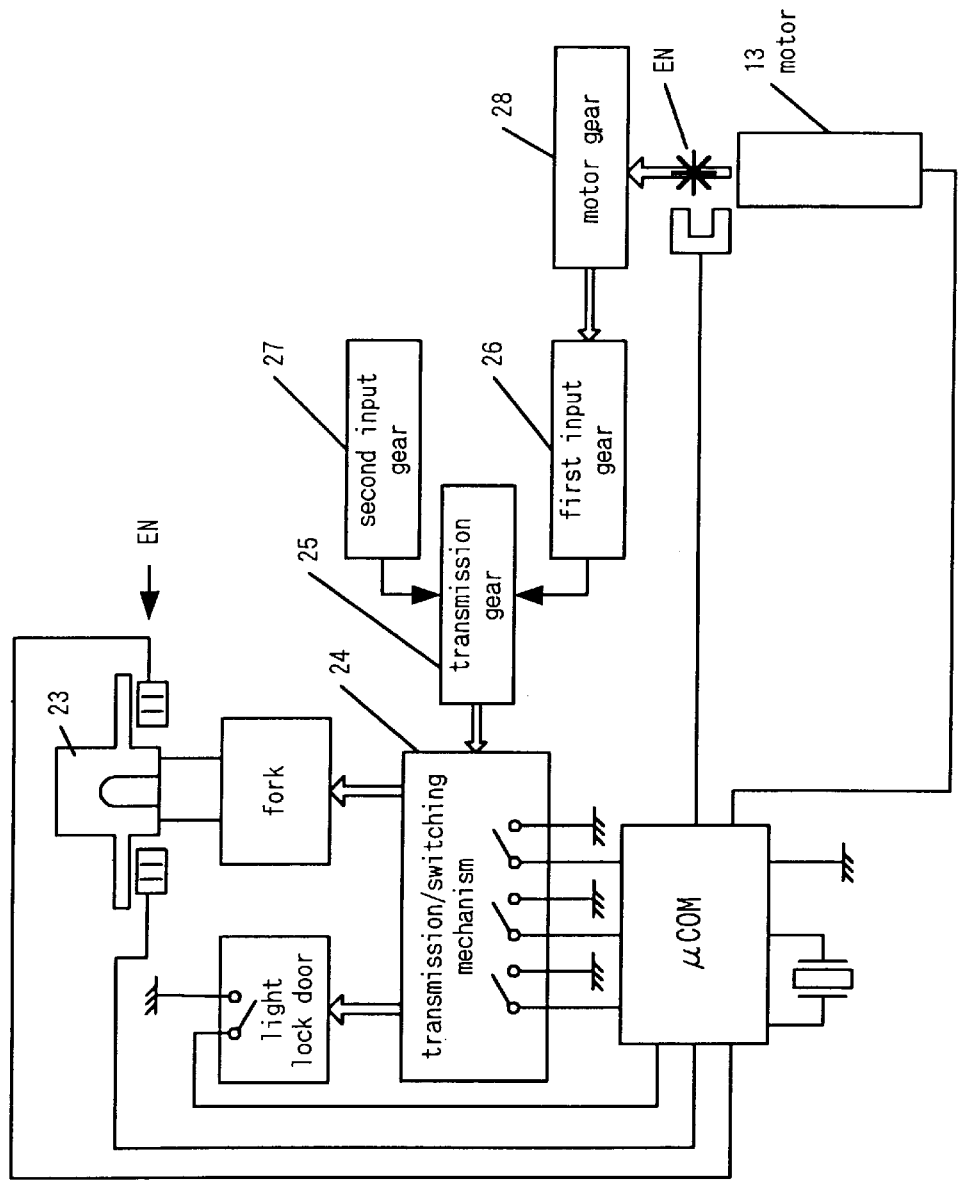
FIG. 5 is a block diagram showing the construction of the control circuit of the drive unit of camera of FIG. 1.
Figure 6:
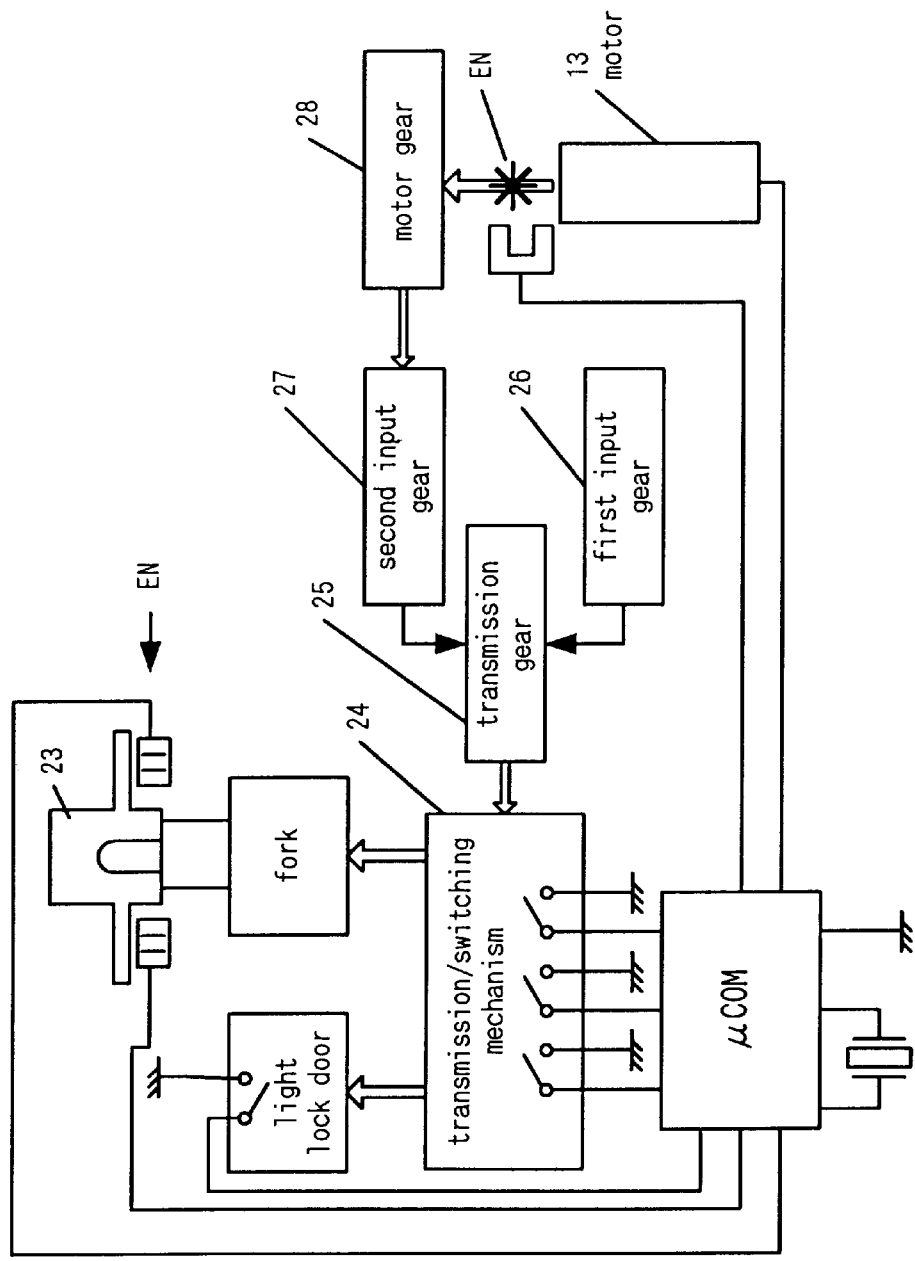
FIG. 6 is a block diagram showing the construction of the control circuit of the drive unit of camera of FIG. 3.

FIG. 5 is a block diagram showing the construction of the control circuit of the drive unit when the motor gear 28 engages the first input gear 26 shown in FIG. 1, and FIG. 6 is a block diagram showing the construction of the control circuit of the drive unit when the motor gear 28 engages the second input gear 27 shown in FIG. 3.

An encoder EN is provided near motor 13 and fork gear 23 to output data such as rotation direction and number of rotations of the motor 13 and fork gear 23 to a microcomputer ($\mu$com). The microcomputer controls the rotation direction and number of rotations of the motor 13 in accordance with the programmed camera control sequence, and switches the transmission/switching mechanism 24 of the drive unit to a predetermined state. In the case of the present embodiment, since it is not assumed that the first input gear 26 and second input gear 27 are used simultaneously, the first input gear 26 and second input gear 27 need not have the same number of gear teeth, which may be determined according to the motor performance, camera specifications and size relative to the number of gear teeth of the motor gear 28 and the like. 9

Figure 7:
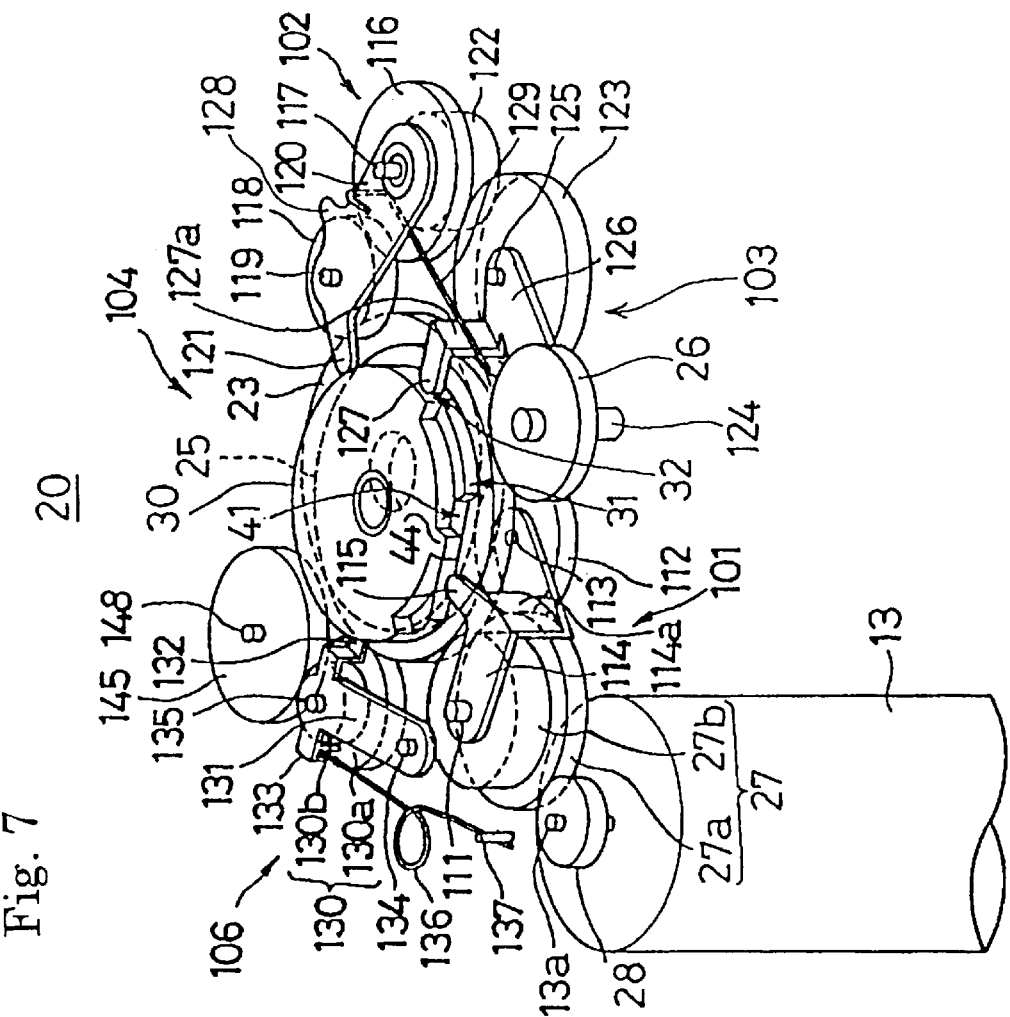
FIG. 7 is a perspective view of the essential part of the drive unit viewed from the front side of the camera.
Figure 8:
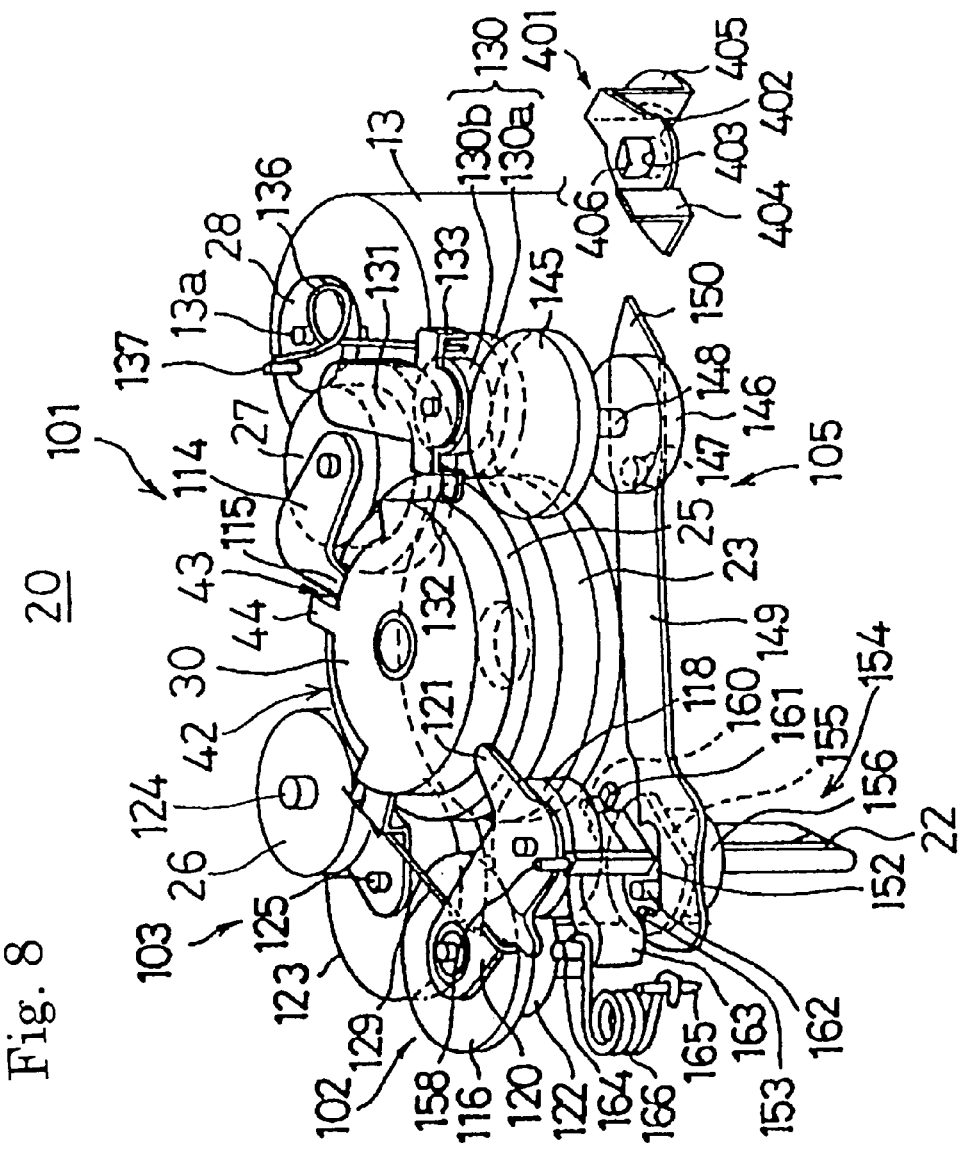
FIG. 8 is a perspective view of the essential part of the drive unit viewed from the back side of the camera.
Figure 9:
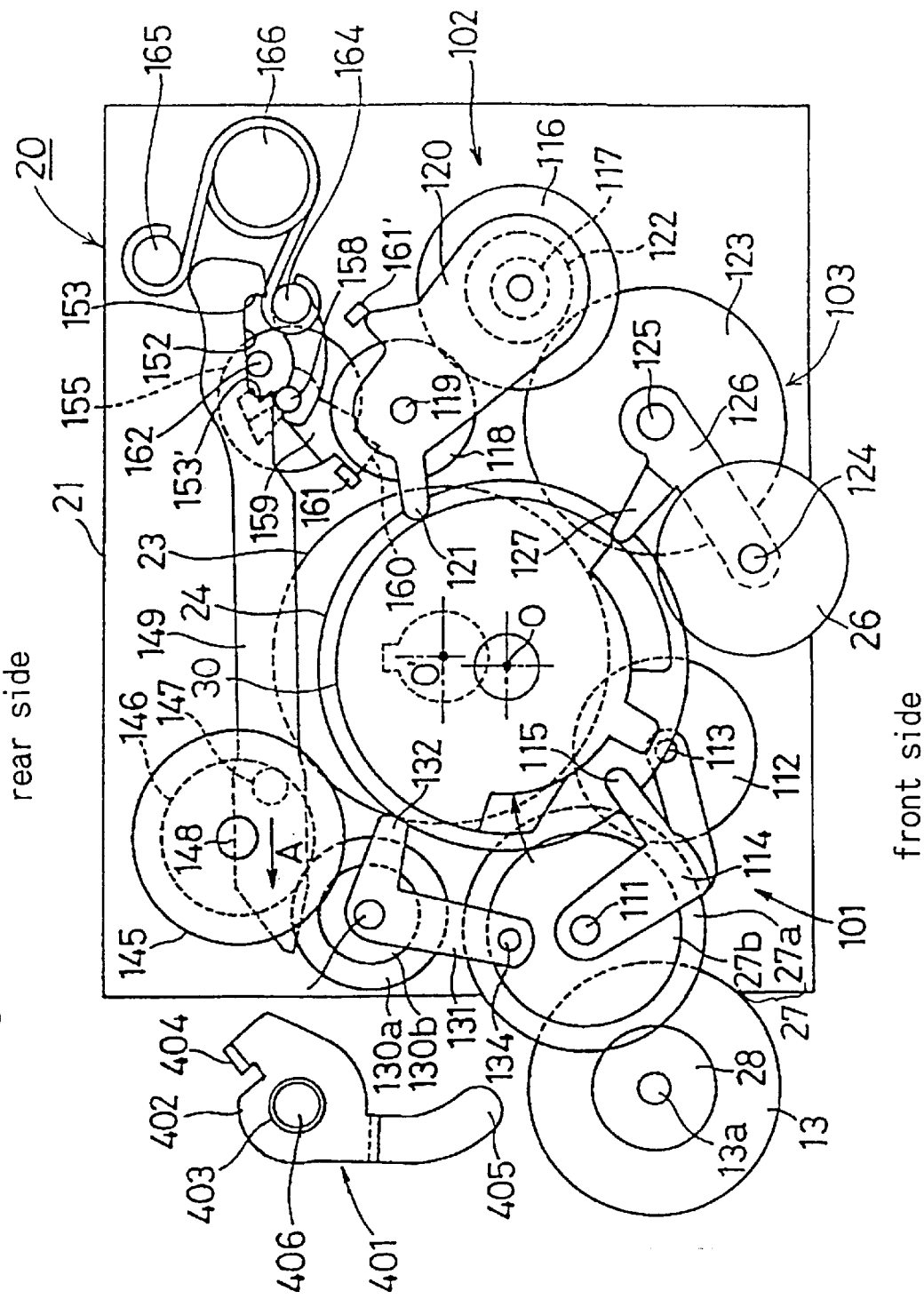
FIG. 9 is a plane view of the essential part of the drive unit viewed from the top of the camera.

An example of the construction of the drive unit 20 is described hereinafter. FIG. 7 is a perspective view of the essential part of the drive unit viewed from the front side of the camera; FIG. 8 is a perspective view of the essential part of the drive unit viewed from the back side of the camera; and FIG. 9 is a plane view of the essential part of the camera viewed from the top of the drive unit. In FIG. 7 the mechanisms related to operation of the light lock door of the cartridge and unlocking the cartridge compartment cover 8 are omitted.

Drive unit 20 comprises first and second input gears 26 and 27 for transmitting the drive force of motor 13 to fork gear 23, rewinding planetary gear unit 101 for rewinding film by selectively engaging fork gear 23, winding planetary gear unit 102 for winding film by selectively engaging fork gear 23 to transmit a drive force to the spool drive gear train, thrust planetary gear unit 103 for pushing film during film loading, cam mechanism 104 for switching the transmission of the drive force of motor 13, crank mechanism 105 for releasing the lock of the cartridge compartment cover 8 and operating the light lock door of cartridge 15, and cover operating planetary gear 106 for transmitting the drive force of motor 13 to the crank mechanism 105. Motor gear 28 fixedly attached to the drive shaft of motor 13 engages the second input gear 27. The second input gear 27 comprises a bottom gear 27a and a top gear 27b which have different numbers of gear teeth.

Cam mechanism 104 is controlled so as to selectively switch the engagement of predetermined gears including the various planetary gears 112, 118, 123, and 130 of the rewinding planetary gear unit 101, winding planetary gear unit 102, thrust planetary gear unit 103, and door operating planetary gear unit 106 in accordance with the various drive modes for film rewinding, film winding, film loading, and unlocking of the cartridge compartment cover 8 (hereinafter referred to simply as "unlocking")

Cam mechanism 104 includes a disc-like cam 30 having a diameter somewhat smaller than transmission gear 25, said cam 30 being connected to the rotating shaft formed on the center top surface of transmission gear 25 via a one-way clutch. On the circumferential surface of cam 30 are formed two types of cam surfaces: a bottom first cam surface 31 and a top second cam surface 32. Cam 30 rotates integratedly as a unit with transmission gear 25 when transmission gear 25 rotates in a clockwise direction as viewed from the top of the camera, so as to rotate the cam surfaces 31 and 32. When the transmission gear 25 rotates in the counterclockwise direction, the one-way clutch idles, and the first cam surface 31 and second cam surface 32 are maintained at set positions. Although in the present embodiment the cam mechanism 104 is disposed such that the rotational center O of the transmission gear 25 is positioned somewhat eccentrically to the front side of the camera from the rotational center O' of fork gear 23, it is to be understood that these rotational centers may be concentric. Rewinding planetary gear unit 101 includes the second input gear 27 which functions as a sun gear, planetary gear 112 which engages the bottom gear 27a of said second input gear 27, and carrier 114 which allows planetary gear 112 to revolve around the periphery of the rotating shaft 111 of said second input gear 27. In the drive mode for film rewinding (hereinafter referred to as "rewinding mode"), the drive force of motor 13 is transmitted to fork gear 23 via motor gear 28 fixedly attached to the drive shaft 13a of motor 13, and bottom gear 27a and top gear 27b of said second input gear 27.

Rewinding planetary gear unit 101 is on the periphery of transmission gear 25, and is interposed between the second input gear 27 and the first input gear 26 which engages the transmission gear 25. Carrier 114 has an L-shape configuration provided with a step-like height difference in the bend area 114a, and has a butting member 115 formed on the top step position of bend area 114a to abut the bottom first cam surface 31 which extends to the side of cam 30. Abutting member 115 regulates the revolution of planetary gear 112.

Motor gear 28, bottom gear 27a of second input gear 27, planetary gear 112, and fork gear 23 are positioned at identical heights. When the drive force of motor 13 is transmitted to the rewinding planetary gear unit 101 via motor gear 28, the planetary gear 112 revolves counterclockwise on the periphery of the second input gear 27 which functions as a sun gear engaged to the fork gear 23. The butting member 115 abuts the first cam surface 31 of cam 30 to regulate the counterclockwise rotation of the carrier 114, thereby regulating the revolution of planetary gear 112.

On the other hand, a cam channel 41 is formed on the bottom first cam surface 31 at a predetermined position in the circumferential direction, such that when cam 30 is set in the block at which abutting member 115 confronts the cam channel 41 (hereinafter referred to as "film rewinding block") the drive unit 20 is set in the rewinding mode. When the set position of cam 30 (hereinafter referred to as cam position") is not set in the film rewinding block, the rotational movement of carrier 114 is regulated, such that planetary gear 112 and fork gear 23 do not engage and the drive force of motor 13 is not transmitted to fork gear 23. When the cam position is set in the film rewinding block, regulation of the counterclockwise rotation of carrier 114 is released, such that planetary gear 112 and fork gear 23 engage and the drive force of motor 13 is transmitted to the fork gear 23.

Winding planetary gear unit 102 is on the periphery of transmission gear 25, and is positioned at the right side of transmission gear 25 as viewed from the front. Thrust planetary gear unit 103 is on the periphery of transmission gear 25, and is positioned at an inclination downward and rightward of the first input gear 26 as viewed from the front. Although in the present embodiment the second input gear 27 has a two-level construction for the purpose of functioning as a sun gear for the planetary gear 112 and transmits the drive force of motor 13 to the transmission gear 25, it is to be noted that the first input gear 26 is normally a flat gear which functions only to transmit the drive force of motor 13 to transmission gear 25.

Winding planetary gear 102 includes sun gear 116, planetary gear 118 which engages sun gear 116, and carrier 120 to revolve the planetary gear 118 on the periphery of shaft 117 of sun gear 116. In the film winding drive mode (hereinafter referred to as "winding mode") and the film loading drive mode (hereinafter referred to as "loading mode"), the drive force of motor 13 transmitted to the transmission gear 25 is transmitted to spool 11 via planetary gear 118, sun gear 116, and the drive gear train. An abutting member 121 is formed on the end of carrier 120 on the side of planetary gear 118 and abuts the top second cam surface 32 which extends on the cam 30 side.

Thrust planetary gear unit 103 includes a gear 122 integratedly formed on the bottom of sun gear 116 of the winding planetary gear unit 102, planetary gear 123 which engages said gear 122, carrier 126 to revolve planetary gear 123 on the periphery of shaft 124, and torsion coil spring 129. In the loading mode, thrust planetary gear unit 103 transmits the drive force of motor 13 transmitted to transmission gear 25 to fork gear 23 via winding planetary gear unit 102, gear 122, and planetary gear 123. Although in the present embodiment shaft 124 at the revolutionary center of planetary gear 123 is optimally provided mesially to planetary gear 123 and planetary gear 112 so as to have the same axis as the rotating shaft of the first input gear 26, it is to be noted that the present invention is not limited to this arrangement.

An L-shaped abutting member 127 is provided at a suitable position on the side surface carrier 126 confronting the cam 30 such that the raised tip abuts the first cam surface 31 of cam 30. The torsion coil spring 129 exerts a force on planetary gear 118 and planetary gear 123 toward the transmission gear 25 and fork gear 23 side; the center of the coil is mounted to the periphery of shaft 117, and one end of an arm is fixedly mounted to a boss 128 formed at a suitable location on carrier 120, and the other end of the arm presses against the riser 127a of abutting member 127 of carrier 127. Abutting member 121 regulates the revolution of planetary gear 118, and abutting member 127 regulates the rotation of planetary gear 123 toward fork gear 23.

The planetary gear 123 of thrust planetary gear unit 103 is provided at a position of equal height to the fork gear 23. Sun gear 116 ad planetary gear 118 of winding planetary gear unit 102 are provided at positions of equal height to the transmission gear 25. A counterclockwise rotational force around the shafts 117 and 124 is exerted on carrier 120 and carrier 126 by the torsion coil spring 129. Therefore, planetary gear 118 revolves in a counterclockwise direction around sun gear 116 engaged to transmission gear 25. Planetary gear 123 rotates in a counterclockwise direction around the shaft 124 engaged to the sun gear 122 which engages the fork gear 23. Since the abutting member 121 and abutting member 127 respective abut the second cam surface 32 and first cam surface 31 of cam 30, the counterclockwise rotation of carrier 120 and carrier 126 are regulated, such that the revolution of planetary gear 118 and rotation of planetary gear 123 toward the fork gear 23 side are regulated.

Two cam channel 42 and 43 are formed on top second cam surface 32 at suitable locations in the circumferential direction overlapping cam channel 41 formed on the aforesaid first cam surface 31. The drive unit 20 is set in either the winding mode or loading mode when the cam position is set at the block wherein abutting member 121 is opposite cam channel 43 (hereinafter referred to as "film winding block"), or the block wherein abutting member 121 is opposite the cam channel 2 and abutting member 127 is opposite the cam channel 42 (hereinafter referred to as "loading block").

When the cam position is set at neither the film winding block nor the loading block, the counterclockwise rotation of carrier 120 is regulated, such that planetary gear 118 and cam gear 138 do not engage, and the drive force of motor 13 is not transmitted to spool 11. On the other hand, when the cam position is set at either the film winding block or loading block, regulation of the counterclockwise rotation of the carrier 120 is released, such that planetary gear 1118 and cam gear 138 engage, and the drive force of motor 13 is transmitted to spool 11 via a drive gear train not shown in the illustration.

When the cam position is not set at the loading block, the rotation of carrier 126 is regulated, such that planetary gear 123 and fork gear 23 do not engage, and the drive force of motor 13 is not transmitted to fork gear 23. On the other hand, when the cam position is set at the loading block, the regulation of the rotation of carrier 126 is released, such that planetary gear 123 engages fork gear 23, and the drive force of motor 13 is transmitted to fork gear 23.

As shown in FIGS. 8 and 9, crank mechanism 105 includes a rectangular crank lever 149, disc-shaped crank plate 146, and crank gear 145, and is provided on the end of drive unit 20 on the back side of the camera. Crank lever 149 moves reciprocatingly in lateral directions of camera body 1, so as to rotate via said reciprocating movement the lock release lever 401 provided on camera body 1 so as to be rotatable, and thereby unlock cartridge compartment cover 8. Crank lever 149 rotates key 22 via said reciprocating movement to operate the light lock door provided on the other end of drive unit 20 so as to be rotatable, thereby operating the light lock door. A contact area 150 which is tapered from the tip is formed on the left end of crank lever 149. A concave slot 152 is formed on the edge of the right front side of crank lever 149.

Key 22 is provided at a position on baseplate 21 opposite a key hole of cartridge 15, such that key 22 is rotatable between a position at which the light lock door is completely open (hereinafter referred to as "open position") and a position at which the light lock door is completely closed (hereinafter referred to as "closed position"). As shown in FIG. 8, key 22 protrudes downward from the center of the bottom surface of disc-shaped base 156 which has a collar 155 on the top surface, and has a predetermined shape so as to engage the key hole (not illustrated) of cartridge 15.

A shaft 158 protrudes from the center of the top surface of collar 155. A contact area 159 also extends from the shaft 158 in the radius direction at a suitable location on the top surface of collar 155, and an abutting member 160 is formed on the leading end of said contact area 159 in the radius direction and extends outward from the surface of collar 155. Abutting member 160 contacts stoppers 161 and 161' protruding alternatingly at suitable positions on support panel 167 at predetermined angles (about 90 degrees in the drawing), so as to regulate the rotation range of key 22 between the open position and the closed position, Stopper 161 corresponds to the open position, and stopper 161' corresponds to the closed position.

A connecting pin 162 is provided so as to protrude upward to connect the connections 153 and 153' on bilateral ends of the concavity 152 of crank lever 149. An arm 163 curved in the radius direction protrudes from an intermediate position of shaft 158, and a pin 164 protrudes parallel to the shaft 158 on the leading edge top surface of arm 163. A tension coil spring 166 is disposed medially to the aforesaid pin 164 and pin 165 protruding from support panel 167 at a suitable location, and bilateral ends of tension coil spring 166 are supported by pins 164 and 165 so as to be rotatable. Tension coil spring 166 exerts a rotational force on key 154.

Therefore, when a cartridge 15 is loaded in cartridge compartment 12, key 22 is held at a position at which contact area 159 abuts stopper 161 (open position) via the spring force of coil spring 166.

In the mode in which light lock door of cartridge 15 is operated and cartridge compartment cover 8 is unlocked (hereinafter referred to as "door operating mode"), when crank lever 149 executes reciprocating movement, connector 153 engages connecting pin 162 of key 154 in conjunction with the movement of the crank lever 149 such that key 22 is reversely rotated to the closed position. In this way the light lock door of cartridge 15 is closed. When crank lever 149 moves from the standby position by a predetermined amount, the spring force of torsion coil spring 166 applies a counterclockwise rotation force on key 22. In this way key 22 is fixed at the closed position, and light lock door 502 is maintained in the closed state.

After the light lock door of cartridge 15 is completely closed, contact area 150 abuts the contact area 404 of lock release lever 401 via the movement of crank lever 149, so as to rotate lock release lever 401 in the counterclockwise direction around shaft 406. In this way the locking mechanism (no illustrated) of cartridge compartment cover 8 is released.

Crank gear 145 and crank plate 146 are respectively fixedly attached to the top end and bottom end of shaft 148 which is rotatably supported by an intermediate baseplate or the like not shown in the drawing, such that crank plate 146 integratedly rotated via the rotation of crank gear 145. A crank pin 147 protrudes downward from the peripheral edge of the bottom surface of crank plate 146. Crank pin 147 fits into round hole 151 at a suitable location on the left end of crank lever 149. When crank gear 145 rotates, crank plate 146 integratedly rotates therewith, such that crank pin 147 rotates around the periphery of shaft 148 and crank lever 149 moves in a lateral direction.

In the door operating mode, the cover operating planet gear unit 106 transmits the drive force of motor 13 transmitted to transmission gear 25 to crank gear 145 via planet gear 130, and is disposed around the transmission gear 25 at a position on the left side of transmission gear 25 as viewed from the front. Cover operating planetary gear unit 106 includes planetary gear 130 comprising a two-level gear, carrier 131 supports planetary gear 130 so as to be rotatable around a predetermined shaft 134, and tension coil spring 136 for exerting a rotational force in the clockwise direction on carrier 131. As shown in FIG. 6, a top second planetary gear 130b of planetary gear 130 is provided so as to engage crank gear 145.

Carrier 131 supports planetary gear 130 so as to be rotatable around shaft 134. An L-shaped abutting member 132 is formed at a suitable location on the side of carrier 131 facing cam 30. The tip of abutting member 132 curves downward to contact first cam surface 31 of cam 30. A connector 133 is formed at a suitable location on the side of carrier 131 opposite the side facing cam 30. On end of the tension coil spring 136 shown in FIG. 8 connects to the stopper 133, and the other end connects to pin 137 provided on, for example, top baseplate 29 or the like shown in FIGS. 1 and 2.

Abutting member 132 regulates the rotation of planetary gear 130 toward cam gear 30 around the shaft 134. As shown in FIG. 8, the bottom first planetary gear 130a of planetary gear 130 is positioned at the same height as transmission gear 25. A rotational force in the clockwise direction is applied to carrier 131 around the shaft 134 via the spring force of tension coil spring 136, such that planetary gear 130 engages transmission gear 25 and rotates around shaft 134. Since abutting member 132 contacts the first cam surface 31 of cam 30, however, the clockwise rotation of carrier 131 is regulated such that planetary gear 130 rotates toward transmission gear 25.

Accordingly, when the cam position is not set at the block in which abutting member 132 faces cam channel 41 of the first cam surface 31 (hereinafter referred to as "door operating block"), the clockwise rotation of the carrier 131 is regulated such that planetary gear 130 and transmission gear 25 do not engage, and the drive force of motor 13 is not transmitted to crank gear 145. On the other hand, when the cam position is set at the door operating block, the regulation of rotation of carrier 131 is released, first planetary gear 130a engages transmission gear 25, and the drive force of motor 13 is transmitted to crank gear 145.

Although the present embodiment has been described in terms of motor gear 28 engaging the second input gear 27, it is to be understood that the operation is essentially identical even when motor gear 28 engages the first input gear 26. In this instance, the drive force of motor 13 is transmitted to transmission gear 25 via first input gear 26, and the second input gear 27 functions as a sun gear for the winding planetary gear unit 101.

Figure 10:
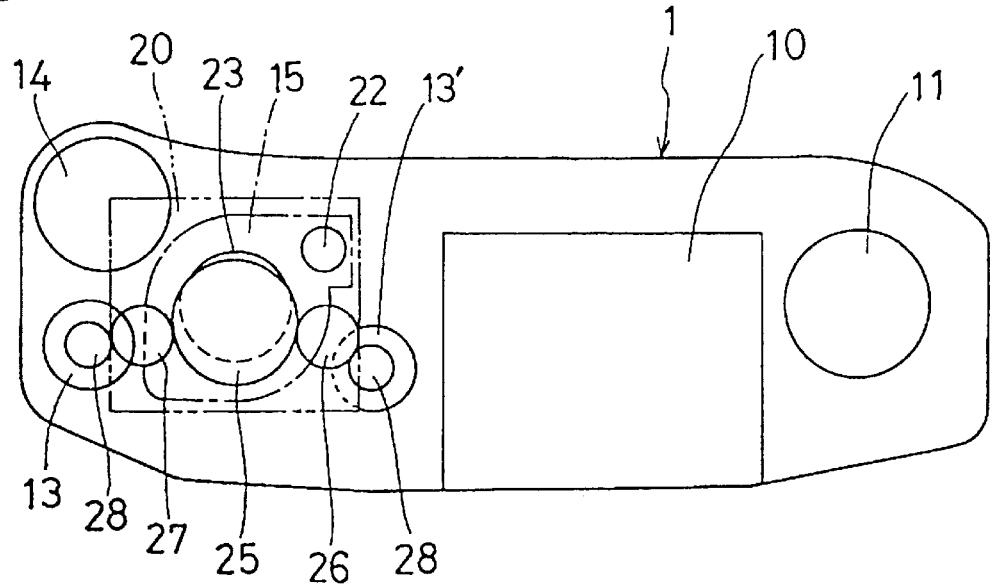
FIG. 10 is a section view of a camera having two motors using the drive unit of the present invention.
Figure 11:
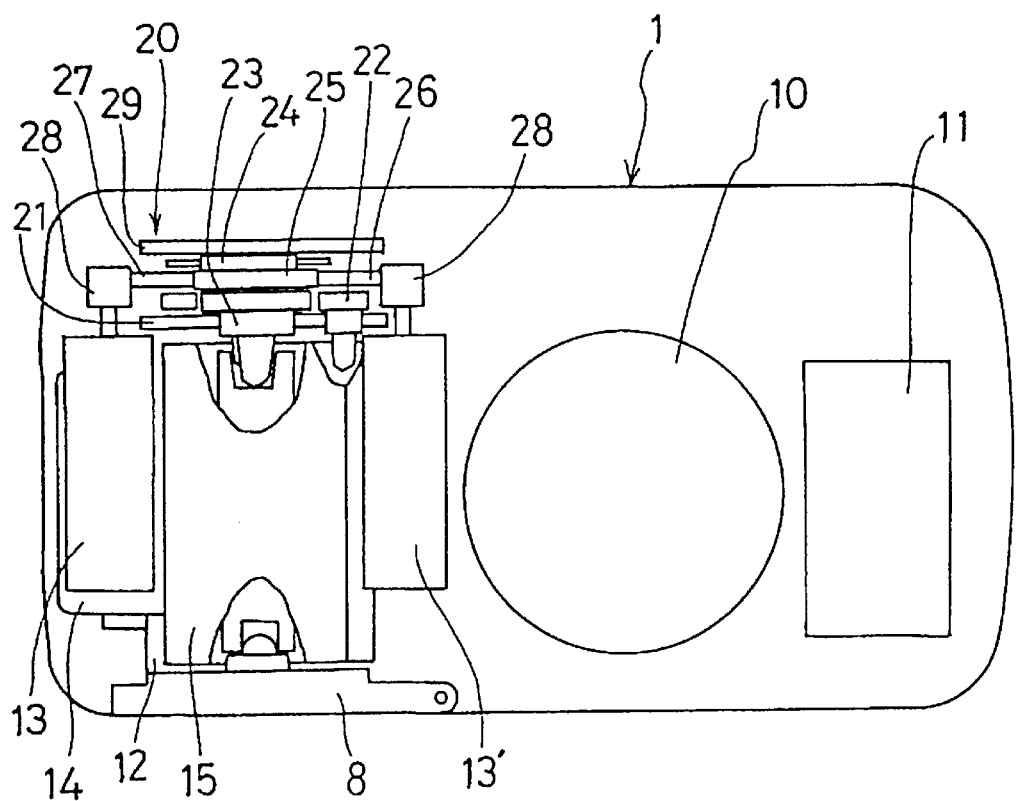
FIG. 11 is a front section view of the camera of FIG. 10.
Figure 12:
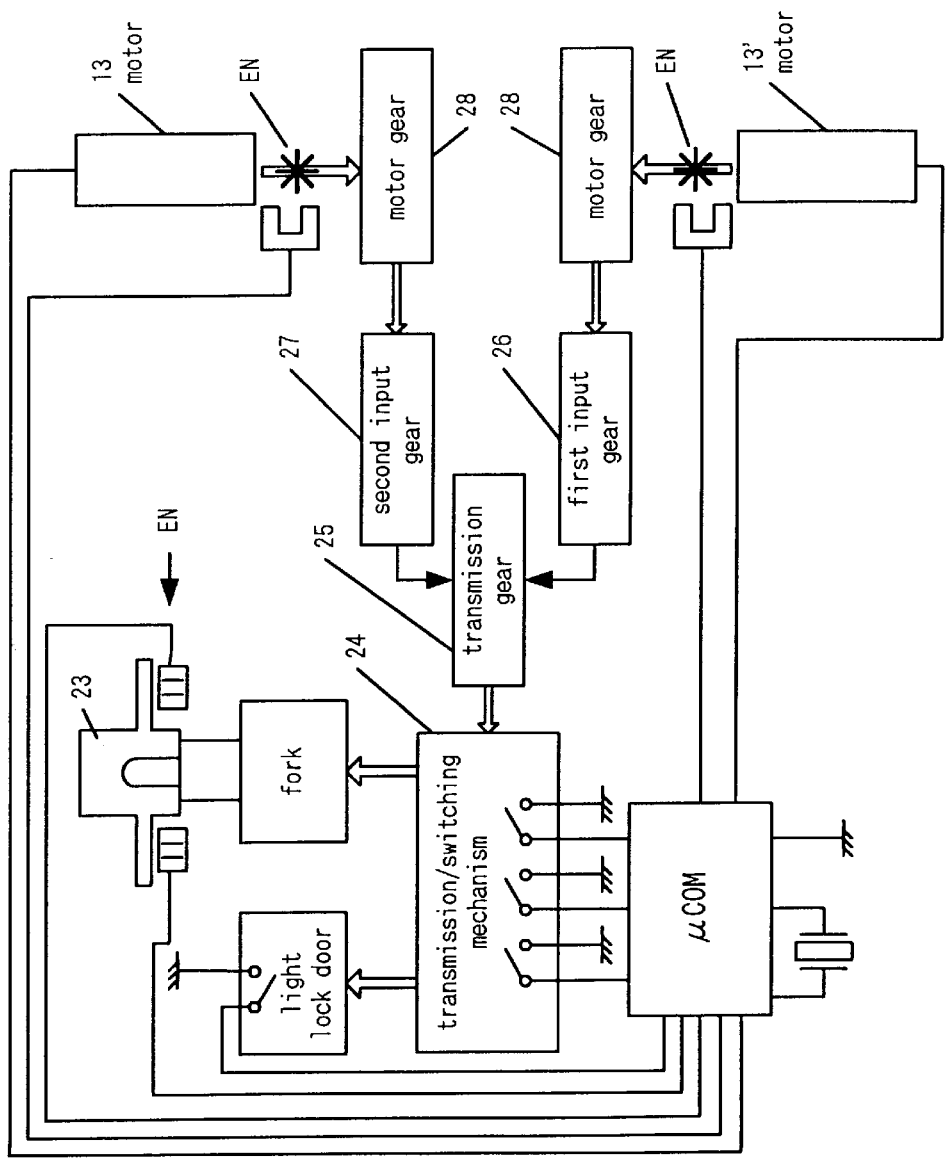
FIG. 12 is a block diagram showing the construction of the control circuit of the drive unit of camera of FIG. 10.

As shown in FIGS. 10 and 11, motors 13 and 13' may engage both the first input gear 26 and the second input gear 27. The construction of the control circuit for this drive unit is shown in FIG. 12. Encoders are placed near each motor 13 and 13', and the rotation direction, number of rotations, and ON/OFF switching of each motor is controlled by a microcomputer. Applications using two motors are described below.

A first application divides the use of two motors as necessary to selectively switch the drive transmission states of the first and second input gears 26 and 27 for use as planetary gears so as to engage motors having mutually different characteristics. In general, when exposed photographic film is wound one frame at a time, the shutter and the like are simultaneously charged by the motor drive force. Accordingly, in this instance, the motor having a large drive force is selected to drive transmission gear 25 at high speed. In this way the time required for film winding and shutter charging is reduced. On the other hand, when rewinding the film in the cartridge, shutter charging is unnecessary, so the motor drive force need not be so large. Therefore, when rewinding the film, the motor having the smaller drive force is selected to drive the transmission gear 25 at slow speed. As a result, the camera can be controlled at optimum speed, and battery life is improved.

A second application synchronizes the drive of both motors 13 and 13' so as to simultaneously transmit the drive forces of both motors 13 and 13' to transmission gear 25 and utilize the performance of both drive motors. In this instance, when the required drive force of the transmission gear 25 is constant, the drive force of each motor may be less than when one motor drive the transmission gear 25. In other words, smaller motors which are unusable individually may be used to achieve a camera of greater compactness.

Although a plurality of input gears are used as motor input units in the aforesaid embodiment, it is to be noted that since said plurality of input gears normally mutually transmit a drive force, a single input gear may be used as a motor input unit, and the other input gear may be used as an output unit to drive other drivable components.

The drive unit of the present invention, for example, provides a transmission gear for transmitting a drive force to a fork gear or the like to rewind film in a cartridge, and a plurality of input gears provided at mutually different positions for transmitting a drive force to a transmission gear, and therefore allows common use of a drive unit in cameras using the same type of cartridge. Furthermore, any input gear may be selected to engage the motor gear (i.e., a gear mounted on the drive shaft of a motor), thereby increasing the freedom of motor arrangement.

Since the transmission gear is disposed so as to cover the rotational center of the fork gear, the size of the drive unit may be reduced in the direction of connection of the fork gear and the rotational center of the transmission gear.

In APS cameras, for example, the film can be pulled from the cartridge when loading the film using a construction wherein the fork gear is rotatable in both directions so as to rewind film into the cartridge via rotation in one directions, and feed film from the cartridge via rotation in the opposite direction.

Effective motor placement can be achieved using fewer input gears by dividing said plurality of input gears into four mutually different quadrants via an axis parallel to the optical axis of the camera and an axis perpendicular thereto through the rotation center of the fork gear. Dead space is further reduced by eliminating unnecessary input gears.

The cartridge is constructed as a box-like unit accommodating film wound upon a spool, and has a projecting unit extending tangential from said box-like unit to feed film from the cartridge, and a projecting unit of the cartridge is disposed in a direction perpendicular to the optical axis with a single input gear provided on the object side (front of camera) from the projecting unit of the cartridge in the optical axis direction, such that in the case of, for example, cameras using a single focal length lens having a relatively small barrel, the drive motor can be placed in the space between the barrel and the cartridge compartment so as to reduce the size of the camera in the lateral direction.

The height of the camera can be reduced by combining the baseplate supporting the fork gear and at least the roof of the cartridge compartment in the camera body.

In addition, film winding and rewinding, for example, can be accomplished by a single motor by providing a transmission switching mechanism to transmit the drive force of the transmission gear to a fork gear and at least one other transmission mechanism.

The size of the drive unit in the lateral direction of the camera can be reduced by providing an output gear between at least two mutually adjacent input gears so as to output a drive force of a transmission gear.

The drive force input to the drive unit can be increased and the film winding operation and film rewinding operation can be accomplished at high speed by transmitting drive forces mutually difference drive sources to at least two among a plurality of input gears. Alternatively, the drive force of a plurality of motors may be selectively input to a plurality of input gears to optionally control the film winding speed and rewinding speed.

The drive unit of the present invention may be used in devices other than cameras, such as, for example, film scanners or photo players using the IX240 film cartridge.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A drive unit capable of being installed in a device, said drive unit comprising:
   a support member;
   a first input gear supported by said support member at a first position;
   a second input gear supported by said support member at a second position differing from said first position; and
   a transmission gear for receiving a drive force from one of said first and second input gears when said drive unit is installed in said device,
   wherein the remaining one of said first and second input gears is free from engaging with any gears except for the transmission gear when said drive unit is installed in said device.

2. A drive unit according to claim 1, further comprising:
   an output gear to which said transmission gear transmits the drive force,
   wherein said transmission gear is arranged so as to overlap with the rotational center of said output gear.

3. A drive unit according to claim 1, further comprising:
   a transmission mechanism for transmitting said drive force to a member of said drive unit different from said output gear.

4. A drive unit according to claim 3, wherein said transmission mechanism has a gear to output the drive force arranged between said first input gear and said second input gear.

5. A drive unit for a camera comprising:
   a fork gear capable of engaging a spool of a film cartridge;
   a transmission gear for transmitting a drive force to said fork gear;
   a first input gear;
   a second input gear; and
   a support member for supporting said fork gear and said transmission gear as a unit, wherein the support member has a plurality of support portions to support said first input gear and said second input gear disposed at respectively different positions to transmit said drive force to said transmission gear.

6. A drive unit according to claim 5, wherein said transmission gear is arranged so as to cover the rotational center of said fork gear.

7. A drive unit according to claim 5, further comprising:
   a transmission mechanism for transmitting said drive force to a member of said drive unit other than said fork gear; and
   a transmission switching mechanism for selectively transmitting the drive force to either said fork gear or said other member.

8. A drive unit according to claim 7, wherein said transmission mechanism has a gear to output the drive force arranged between said first input gear and said second input gear.

9. A drive unit according to claim 5, wherein said first input gear receives the drive force from a motor and said second input gear outputs the drive force from said transmission gear.

10. A drive unit according to claim 5, wherein said first input gear receives the drive force from a first motor and said second input gear receives the drive force from a second motor.

11. A drive unit according to claim 5, wherein said fork gear is rotatable in both directions so as to rewind film into a cartridge via rotation in one direction, and feeds film from the cartridge via rotation in the opposite direction.

12. A drive unit according to claim 5, wherein said first input gear is disposed in one of four mutually different quadrants of an area dividing the four mutually different quadrants via an axis parallel to the optical axis of the camera and an axis perpendicular thereto through the rotation center of said fork gear and said second input gear is disposed in one of the other three quadrants.

13. A drive unit according to claim 5, further comprising a cartridge which is constructed as a box-like part for accommodating film wound upon a spool, said cartridge comprises a projecting part extending tangentially from said box-like part to feed film from the cartridge, said cartridge is disposed in the camera such that the projecting part of the cartridge is disposed in a direction perpendicular to the optical axis of a lens and one of said input gears is disposed on an object side from said projecting part of the cartridge in the optical axis direction.

14. A drive unit according to claim 5, wherein said support member is a part of the cartridge compartment in the camera.

15. A drive unit according to claim 2, further comprising:
   a transmission switching mechanism for selectively switching the drive force to said output gear or said transmitting mechanism.

16. A drive unit according to claim 2, wherein said device is a camera, and said drive unit is adapted to drive a film cartridge loaded in the camera.

17. A drive unit according to claim 16, further comprising:
   a spool for driving film of the film cartridge by engaging with said film cartridge,
   wherein said output gear is fixed to said spool, whereby said spool drives film of said cartridge when said output gear is driven by said transmission gear.

18. A drive unit adapted to be installed in either a first device or a second device, the first device and the second device having mutually different mechanisms for transmitting a drive force, said drive unit comprising:
   a support member;
   a first input gear supported by said support member at a first position;
   a second input gear supported by said support member at a second position differing from said first position; and
   a transmission gear for receiving a drive force from said first input gear when the drive unit is installed in the first device and for receiving a drive force from said second input gear when the drive unit is installed in the second device.

19. A drive unit adapted to be installed in either a first device or a second device, the first device and the second device having mutually different mechanisms for transmitting a drive force, said drive unit comprising:
   a transmission gear;
   a first input gear which engages with said transmission gear at a first position; and
   a second input gear which engages with said transmission gear at a second position differing from said first position,
   wherein said first input gear does not engage with any gears except for said transmission gear when the drive unit is installed in the second device, and said second input gear does not engage with any gears except for said transmission gear when the drive unit is installed in the second device.

20. A drive unit adapted to be installed in either a first device or a second device, the first device and the second device having mutually different mechanisms for transmitting a drive force, said drive unit comprising:
- a first gear;
- a second gear;
- a third gear; and
- a transmission gear which engages with all of said first, second and third gears, wherein said drive unit is capable of taking a plurality of transmitting routes to transmit a drive force, each of said plurality of transmission routes being defined by a combination of said transmission gear and at least two of said first, second and third gears;

wherein, when said drive unit is installed in the first device, the drive force is transmitting along a first transmission route of the plurality of transmission routs, and wherein, when said drive unit is installed in the second device, the drive force is transmitted along a second transmission route of the plurality of transmitting routs, said first transmission route being different from said second transmission route.

* * * * *